(12) United States Patent
Rifaut et al.

(10) Patent No.: US 11,577,458 B2
(45) Date of Patent: Feb. 14, 2023

(54) ADDITIVE LAYER MANUFACTURING METHOD AND ARTICLES

(71) Applicant: 3M INNOVATIVE PROPERTIES COMPANY, St. Paul, MN (US)

(72) Inventors: Jean-Luc Rifaut, Brussels (BE); Jens Eichler, Kaarst (DE); Tilo Remhof, Hilden (DE); Brian D. Goers, Minneapolis, MN (US); Brian A. Shukla, Maplewood, MN (US); Alexander J. Kugel, Woodbury, MN (US); Maiken Givot, St. Paul, MN (US); Michael C. Harper, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 44 days.

(21) Appl. No.: 16/973,150

(22) PCT Filed: Jun. 27, 2019

(86) PCT No.: PCT/IB2019/055474
§ 371 (c)(1),
(2) Date: Dec. 8, 2020

(87) PCT Pub. No.: WO2020/003212
PCT Pub. Date: Jan. 2, 2020

(65) Prior Publication Data
US 2021/0245433 A1    Aug. 12, 2021

Related U.S. Application Data

(60) Provisional application No. 62/691,884, filed on Jun. 29, 2018.

(51) Int. Cl.
*B29C 64/245* (2017.01)
*B33Y 10/00* (2015.01)
(Continued)

(52) U.S. Cl.
CPC ............ *B29C 64/245* (2017.08); *B28B 1/001* (2013.01); *B29C 64/153* (2017.08); *B33Y 10/00* (2014.12);
(Continued)

(58) Field of Classification Search
CPC ..... B29C 64/245; B29C 64/153; B33Y 10/00; B33Y 70/10; B33Y 80/00; B29K 2023/12;
(Continued)

(56) References Cited

U.S. PATENT DOCUMENTS

| | | |
|---|---|---|
| 5,332,426 A | 7/1994 | Tang |
| 5,933,701 A | 8/1999 | Stacker |

(Continued)

FOREIGN PATENT DOCUMENTS

| | | |
|---|---|---|
| CN | 1785555 | 6/2006 |
| CN | 1970202 | 5/2007 |

(Continued)

OTHER PUBLICATIONS

International Search Report for PCT International Application No. PCT/IB2019/055474, dated Oct. 4, 2019, 3 pages.

*Primary Examiner* — Nahida Sultana
(74) *Attorney, Agent, or Firm* — Adrian L. Pishko; Sriram Srinivasan

(57) ABSTRACT

An additive layer manufacturing method, preferably using selective laser sintering, for manufacturing a solid article, the method including applying a layer of a powder, the powder including at least one powdered (co)polymer, onto a solid substrate in a processing chamber; fusing the powder layer onto the solid substrate; subsequently depositing successive layers of the powder, wherein each successive layer is selectively fused prior to deposition of the subsequent layer of powder so as to form the article. In some embodi- (Continued)

ments, the powder further includes abrasive particles having a hardness greater than or equal to that of aluminum oxide.

19 Claims, 7 Drawing Sheets

(51) Int. Cl.
| | |
|---|---|
| *B29C 64/153* | (2017.01) |
| *B33Y 70/10* | (2020.01) |
| *B28B 1/00* | (2006.01) |
| *C08K 3/04* | (2006.01) |
| *C08K 3/22* | (2006.01) |
| *C08L 75/06* | (2006.01) |
| *B29K 23/00* | (2006.01) |
| *B29K 77/00* | (2006.01) |

(52) U.S. Cl.
CPC ............... *B33Y 70/10* (2020.01); *C08K 3/04* (2013.01); *C08K 3/22* (2013.01); *C08L 75/06* (2013.01); *B29K 2023/12* (2013.01); *B29K 2077/00* (2013.01); *C08K 2003/2227* (2013.01)

(58) Field of Classification Search
CPC ........ B29K 2077/00; C08K 2003/2227; B22F 10/43; B22F 10/40; B22F 10/28; B22F 12/30
See application file for complete search history.

(56) References Cited

U.S. PATENT DOCUMENTS

| | | | |
|---|---|---|---|
| 5,980,813 A | 11/1999 | Narang | |
| 7,229,586 B2 | 6/2007 | Dunlap | |
| 7,491,792 B2 | 2/2009 | Monsheimer | |
| 7,601,422 B2 | 10/2009 | Gersch | |
| 7,847,057 B2 | 12/2010 | Muller | |
| 7,887,740 B2 | 2/2011 | Simon | |
| 7,927,710 B2 | 4/2011 | Hewel | |
| 7,988,906 B2 | 8/2011 | Monsheimer | |
| 8,840,829 B2 | 9/2014 | Monsheimer | |
| 8,981,010 B2 | 3/2015 | Schmidt | |
| 9,428,610 B2 | 8/2016 | Diekmann | |
| 9,643,360 B2 | 5/2017 | Kashani-Shirazi | |
| 9,777,134 B2 | 10/2017 | Uenlue | |
| 10,787,559 B2 | 9/2020 | Monsheimer | |
| 2004/0081573 A1 | 4/2004 | Newell | |
| 2004/0138344 A1 | 7/2004 | Allen | |
| 2005/0197446 A1 | 9/2005 | Loyen | |
| 2006/0134419 A1 | 6/2006 | Monsheimer | |
| 2007/0182070 A1 | 8/2007 | Monsheimer | |
| 2007/0232753 A1 | 10/2007 | Monsheimer | |
| 2007/0235904 A1 | 10/2007 | Saikin | |
| 2008/0152910 A1 | 6/2008 | Hesse | |
| 2008/0274355 A1 | 11/2008 | Hewel | |
| 2009/0075081 A1 | 3/2009 | Oavrard | |
| 2010/0113661 A1 | 5/2010 | Senff | |
| 2010/0152356 A1 | 6/2010 | Cevolini | |
| 2010/0171241 A1 | 7/2010 | Haskamp | |
| 2011/0052927 A1 | 3/2011 | Martinoni | |
| 2011/0144752 A1 | 6/2011 | Defelice | |
| 2011/0172387 A1 | 7/2011 | Filoa | |
| 2011/0293918 A1 | 12/2011 | Lucas | |
| 2013/0052453 A1 | 2/2013 | Filoa | |
| 2013/0171431 A1 | 7/2013 | Swartz | |
| 2013/0323416 A1 | 12/2013 | Bertelo | |
| 2014/0252685 A1 | 9/2014 | Stacker | |
| 2016/0082662 A1* | 3/2016 | Maj | B29C 64/153 264/409 |
| 2016/0332370 A1* | 11/2016 | Arai | B33Y 30/00 |
| 2017/0088692 A1* | 3/2017 | Bish | C08K 5/31 |
| 2017/0247553 A1* | 8/2017 | Ganapathiappan | B33Y 10/00 |
| 2017/0259503 A1 | 9/2017 | LeFevre | |
| 2017/0266882 A1 | 9/2017 | Yan | |
| 2018/0169946 A1* | 6/2018 | Paternoster | B29C 64/165 |
| 2018/0361662 A1* | 12/2018 | Paternoster | B29C 64/343 |
| 2018/0362727 A1* | 12/2018 | Mitchell | C08K 3/04 |
| 2019/0184632 A1* | 6/2019 | Achten | B33Y 70/00 |
| 2021/0220087 A1* | 7/2021 | Kopelman | B33Y 80/00 |

FOREIGN PATENT DOCUMENTS

| | | |
|---|---|---|
| CN | 101597425 | 12/2009 |
| CN | 101837427 | 9/2010 |
| CN | 102311637 | 1/2012 |
| CN | 102337021 | 1/2012 |
| CN | 102343415 | 2/2012 |
| CN | 102399371 | 4/2012 |
| CN | 102660107 | 9/2012 |
| CN | 102993687 | 3/2013 |
| CN | 103342942 | 10/2013 |
| CN | 103551492 | 2/2014 |
| CN | 103567352 | 2/2014 |
| CN | 103600494 | 2/2014 |
| CN | 103709737 | 4/2014 |
| CN | 103897386 | 7/2014 |
| CN | 103976883 | 8/2014 |
| CN | 104164080 | 11/2014 |
| CN | 104191615 | 12/2014 |
| CN | 104231607 | 12/2014 |
| CN | 104231626 | 12/2014 |
| CN | 104476653 | 4/2015 |
| CN | 104692332 | 6/2015 |
| CN | 104788102 | 7/2015 |
| CN | 104910609 | 9/2015 |
| CN | 105374948 | 3/2016 |
| CN | 105711104 | 6/2016 |
| DE | 102010062875 | 6/2012 |
| EP | 2961585 | 1/2016 |
| JP | 5214313 | 1/2009 |
| JP | 2009149839 | 7/2009 |
| KR | 102004067985 | 7/2004 |
| KR | 102008083873 | 9/2008 |
| KR | 102010093249 | 8/2010 |
| WO | WO 1996-30195 | 10/1996 |
| WO | WO 2002-055451 | 7/2002 |
| WO | WO 2004-037902 | 5/2004 |
| WO | WO 2005-010087 | 2/2005 |
| WO | WO 2005-090448 | 9/2005 |
| WO | WO 2005-105412 | 11/2005 |
| WO | WO 2007-133912 | 11/2007 |
| WO | WO 2008-047063 | 4/2008 |
| WO | WO 2008-087358 | 7/2008 |
| WO | WO 2011-051250 | 5/2011 |
| WO | WO 2012-047613 | 4/2012 |
| WO | WO 2015-109143 | 7/2015 |
| WO | WO 2015-167530 | 11/2015 |
| WO | WO 2017040897 | 3/2017 |
| WO | WO 2017-127561 | 7/2017 |
| WO | WO 2017-127569 | 7/2017 |
| WO | WO 2018-046739 | 3/2018 |

* cited by examiner

ADDITIVE LAYER MANUFACTURING METHOD AND ARTICLES

CROSS REFERENCE TO RELATED APPLICATIONS

This application is a national stage filing under 35 U.S.C. 371 of PCT/IB2019/055474, filed Jun. 27, 2019, which claims the benefit of U.S. Application No. 62/691,884, filed Jun. 29, 2018, the disclosure of which is incorporated by reference in its/their entirety herein.

FIELD

The present disclosure relates to additive layer manufacturing methods, particularly selective laser sintering, and to articles obtained by the methods and to powders to be used in additive manufacturing.

BACKGROUND

Selective Laser Melting/Sintering of polymers, hereinafter referred to as SLS, is one of several known processes of additive manufacturing (3D-printing). In SLS, parts are formed in a layer by layer process by directing an energy beam, e.g. a laser or an electron beam, over a powder of polymer particles and fusing the polymer powder in the areas hit by the energy beam. Usually, a continuous bed of polymer powder is spread over a base plate (i.e. a container for receiving the powder) in a processing/sintering chamber. The energy beam is used to selectively sinter/fuse/melt the powder in a desired preprogrammed pattern by scanning with the energy beam across the surface of the powder bed. The energy beam is controlled to produce the desired pattern from 3D model data of the desired article. Either the energy beam is moved up or down through the powder or the base plate is lowered or raised by the equivalent of the thickness of a layer such that the next layer can be built onto the layer formed in the previous step. The process is repeated to the desired article has been created. Unconsolidated polymer powder can be recycled and used in the next SLS process. In conventional SLS printing the powder bed is provided onto a platform or base plate in a thickness of several layers. Particle fusing takes place within the powder bed. which is of sufficient thickness such that the particles do not fuse onto the base plate.

SUMMARY

Generally, partially crystalline polymers are used in SLS. For processing these powders, the powder bed is heated to a temperature above the crystallization temperature of the polymer. For PA12 (also known as Nylon 12) a polyamide commonly used for making articles with SLS, the powder bed is generally heated above 150° C., which is well above the polyamide's crystallization temperature of 144° C.

Heating of the powder bed is usually performed by heating the processing/sintering chamber. The energy provided by the laser beam is then sufficient to fuse ("sinter") the polymer powder in the desired regions. When the temperature of the sintered polymer article drops below its crystallization temperature, the polymer starts to crystallize which may lead to curling of the article. The process may have to be interrupted to avoid creating distorted articles. Therefore, in conventional SLS the processing temperature is kept well above the crystallization temperature of the polymer to be processed and below the melting temperature of the polymer (about 186° C. for an SLS PA12 powder).

The need for high temperatures and strict temperature control in conventional SLS methods is costly and time-consuming. Unconsolidated powder may undergo thermal ageing in the heated chamber and can no longer be recycled. The necessity to apply rather elevated temperatures also may not allow processing of temperature-sensitive (co)polymers, for example cross-linkable (co)polymers, by SLS.

Therefore, there is a need to provide additive manufacturing method that allows to process at least some materials at low temperatures.

Thus, in one aspect there is provided a method for additive layer manufacturing, preferably selective laser sintering, in an additive manufacturing device for processing a powder, the method comprising:
(i) providing at least one solid substrate that is not a powder in the container of the processing device for receiving the powder for processing wherein the substrate is either placed into to the container and can be removed from it after processing or is removably attached to it;
(ii) placing at least a first layer of a first powder comprising at least a first (co)polymer onto at least a part of the substrate;
(iii) fusing the first (co)polymer onto at least a part of the substrate at a desired location to deposit a first layer of the first (co)polymer onto the substrate by applying energy generated by at least one energy source of the manufacturing device to that location, wherein the substrate has a surface for receiving particles of the first (co)polymer and wherein at least the surface is of different material than the first (co)polymer.

In another aspect there is provided an additive layer manufacturing method, preferably selective laser sintering, for manufacturing an article, the method comprising:
(i) providing a layer of a first powder, the first powder comprising at least one first (co)polymer;
(ii) depositing successive layers of the first powder and selectively fusing each layer prior to deposition of the subsequent layer so as to form the article,
wherein the first powder further comprises particles comprising one or more aluminum oxide, one or more silicon carbide, one or more boron carbide, one or more boron nitride, one or more diamond or combinations thereof.

In a further aspect there is provided an article obtained using an above method.

In yet another aspect there is provided a tool for finishing a surface comprising an article manufactured by a method as above.

In a further aspect there is provide the use of a powder in additive manufacturing, preferably selective laser sintering.

The following Listing of Exemplary Embodiments summarizes the various exemplary illustrative embodiments of the present disclosure.

LISTING OF EXEMPLARY EMBODIMENTS

A. A method for additive layer manufacturing, preferably selective laser sintering, in an additive manufacturing device for processing a powder, the method comprising: providing at least one solid substrate that is not a powder in the container of the processing device for receiving the powder for processing wherein the substrate is either placed into to the container and can be removed from it after processing or is removably attached to it;

placing at least a first layer of a first powder comprising at least a first (co)polymer onto at least a part of the substrate;

fusing the first (co)polymer onto at least a part of the substrate at a desired location to deposit a first layer of the first (co)polymer onto the substrate by applying energy generated by at least one energy source of the manufacturing device to that location, wherein the substrate has a surface for receiving particles of the first (co)polymer and wherein at least the surface is of different material than the first (co)polymer.

B. The method according to Embodiment A, wherein the first and second powder prior to fusing, the container for receiving the powder, and/or the article and/or the substrate material have a temperature below 75° C. before and during manufacturing the article and preferably from about 15 to 30° C. at least 20° C.

C. The method according to any preceding Embodiment, wherein the surface of the substrate contains a plurality of raised and/or lowered areas having at least one longest dimension of from about ⅒ up to about 3 times the size of the particles of the first (co)polymer.

D. The method according to any one of the preceding Embodiments, wherein the method further comprises:

providing at least one layer of a second powder comprising at least a second (co)polymer onto at least a part of the deposited first layer generated in step (iii), fusing the second (co)polymer at a desired location onto at least a part of the (co)polymer layer generated in step (iii) by applying energy generated from at least one energy source of the manufacturing device to that location; wherein the second powder may be identical or different to the first powder and wherein the second (co)polymer may be identical with or different to the first (co)polymer.

E. The method according to any one of the preceding Embodiments, further comprising:

providing at least one layer of a second powder comprising a second (co)polymer and fusing the second (co)polymer onto at least a part of a previously formed layer, wherein the second powder is identical with or different to the first powder and wherein the second (co)polymer is identical with or different to the first (co)polymer and repeating (vi) to create an article, wherein the second powder used in (vii) may be always the same second powder or one or more different second powders.

F. The method according to any one of the preceding Embodiments, wherein the first and second powder prior to fusing, the container for receiving the powder, and/or the article and/or the substrate material have a temperature below 75° C. before and during manufacturing the article and preferably at least 20° C.

G. The method of any one of the preceding Embodiments, wherein the energy generated by the energy source is a laser beam.

H. The method of any one of the preceding Embodiments, wherein the first layer of the first powder has a thickness that is about the same as the thickness of the particle size of the powder.

I. The method of any one of the preceding Embodiments, wherein the first layer of the first powder has a thickness of 300 µm or less and wherein the particle size of the first powder is 300 µm or less.

J. The method according to any one of the preceding Embodiments, wherein the particles of the first (co)polymer have a size of from 3 µm to less than 300 µm.

K. The method according to any one of the preceding Embodiments, wherein the first (co)polymer is a (co)polymer selected from group consisting of thermoplastic (co)polymers, thermoplastic elastomers, and cross-linkable (co)polymers.

L. The method according to any one the preceding Embodiments, wherein the first (co)polymer is a thermoplastic (co)polymer selected from a polyurethane, a fluoropolymer and combinations thereof.

M. The method according to any one of the preceding Embodiments, wherein the first (co)polymer is a thermoplastic (co)polymer and has an elongation at break of at least 200%, preferably at 450%, more preferably at least 500%, most preferably at least 600%.

N. The method according to any one of the preceding Embodiments, wherein the first (co)polymer is a thermoplastic partially fluorinated fluoropolymer.

O. The method according to any one of the preceding Embodiments, wherein the first (co)polymer comprises is a thermoplastic or cross-linkable (co)polymer and comprises units derived from TFE and HFP, further comprises at least one comonomer selected from vinyl fluoride (VF), vinylidene fluoride (VDF), ethene (E) or propene (P) or a combination thereof.

P. The method according to any one of the preceding Embodiments, wherein the first and/or the second powder further comprises at least one (co)polymer selected from the group of polyamides and polypropylenes and a combination thereof.

Q. The method according to any one of the preceding Embodiments, wherein the first and/or the second powder further comprises particles comprising one or more aluminum oxides, one or more silicon carbides, one or more boron carbides, one or more boron nitrides, one or more diamonds and combinations thereof.

R. The method according to any one of the preceding Embodiments, wherein the processing chamber and/or the powder prior to fusing and/or the article and/or the substrate have a temperature below 70° C., preferably below 65° C., more preferably below 60° C., more preferably below 55° C., more preferably below 45° C., more preferably below 40° C., more preferably below 35° C., more preferably below 30° C. prior and during the manufacturing of the article and preferably at least above 0° C., preferably at least above 20° C.

S. The method according to any one of the preceding Embodiments, wherein the substrate has a surface for receiving the particles of the first (co)polymer and wherein the surface comprises a material selected from metals, organic fibers, inorganic fibers, ceramics, and combinations thereof.

T. The method according to any one of the preceding Embodiments, wherein the substrate has a surface for receiving particles of the first (co)polymer and the surface contains a plurality of raised and/or lowered areas having at least one longest dimension of from about ⅒ up to about 3 times the size of the particles of the first (co)polymer and wherein the particles of the first (co)polymer have a size of from 3 µm to less than 300 µm and wherein the areas is in the form of a groove, a ridge, a dome, a pore and a combination thereof.

U. The method according to any one of the preceding Embodiments, wherein the substrate is removably attached to the container for receiving the powder by at least one adhesive.

V. The method according to any one of the preceding Embodiments wherein the substrate is an adhesive tape.

W. An article produced using the method according to any one of Embodiments A to V.

X. A tool for finishing a surface comprising an article manufactured by the method according to any one of Embodiments A to V.

Y. An additive manufacturing process using a powder comprising a first (co)polymer and further comprising particles comprising one or more aluminum oxide, one or more silicon carbide, one or more boron carbide, one or more boron nitride, one or more diamonds and combinations thereof, optionally wherein the additive manufacturing comprises selective laser sintering, wherein the first (co)polymer is selected from thermoplastic (co)polymers, thermoplastic elastomers, and cross-linkable (co)polymers and combinations thereof and wherein the first (co)polymer is present as particles having a size of from 3 μm to 300 μm, inclusive.

Various aspects and advantages of exemplary embodiments of the disclosure have been summarized. The above Summary and Listing of Exemplary Embodiments are not intended to describe each embodiment or every implementation of the embodiments of the present disclosure. The Detailed Description and Examples that follow more particularly exemplify certain presently preferred embodiments using the principles disclosed herein.

BRIEF DESCRIPTION OF THE DRAWINGS

The disclosure may be more completely understood in consideration of the following drawings of various embodiments of the disclosure in connection with the accompanying figures, in which.

Figure 1A:
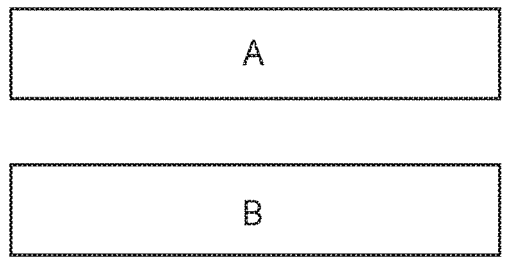
FIG. 1A and FIG. 1B illustrate the concept of constraint laser sintering.

While the above-identified drawings, which may not be drawn to scale, set forth various embodiments of the present disclosure, other embodiments are also contemplated, as noted in the Detailed Description.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description. Contrary to the use of "consisting", the use of "including," "containing", "comprising," or "having" and variations thereof is meant to encompass the items listed thereafter as well as additional items.

Glossary

Certain terms are used throughout the description and the claims that, while for the most part are well known, may require some explanation. It should be understood that:

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

The term "molecularly same (co)polymer" means one or more (co)polymers that have essentially the same repeating molecular unit, but which may differ in molecular weight, method of manufacture, commercial form, and the like.

The terms "particle" and "particulate" are used substantially interchangeably. Generally, a particle or particulate means a small distinct piece or individual part of a material in finely divided form. However, a particulate may also include a collection of individual particles associated or clustered together in finely divided form. Thus, individual particles used in certain exemplary embodiments of the present disclosure may clump, physically intermesh, electrostatically associate, or otherwise associate to form particulates. In certain instances, particulates in the form of agglomerates of individual particles may be intentionally formed such as those described in U.S. Pat. No. 5,332,426 (Tang et al.).

The term "mean particle diameter" means the number-average diameter obtained by measuring the diameter of 50 individual particles using Scanning Electron Microscopy (SEM).

The terms "about" or "approximately" with reference to a numerical value or a shape means +/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" used with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Unless indicated otherwise the total amounts of ingredients of a composition expressed as "percentage by weight", "% by weight" or "wt. %" or similar add up to 100%, i.e., the total weight of the composition is 100 wt. % unless stated otherwise. Likewise, unless indicated otherwise the total amounts of ingredients of a composition expressed as "percentage by volume", "vol %" or similar add up to 100% and the total volume of the composition is 100% unless stated otherwise.

Any numerical range recited herein describing a physical property or a concentration is intended to include all values from the lower value to the upper value of that range and including the endpoints. For example, a concentration range of from 1% to 50% is intended to be an abbreviation and to expressly disclose the values between the 1% and 50%, such as, for example, 2%, 40%, 10%, 30%, 1.5%, 3.9% and so forth.

As used in this specification and the appended embodiments, the singular forms "a", "an", and "the" include plural referents unless the content clearly dictates otherwise. Thus, for example, reference to fine filaments containing "a compound" includes a mixture of two or more compounds. As used in this specification and the appended embodiments, the term "or" is generally employed in its sense including "and/or" unless the content clearly dictates otherwise.

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

By using the term "overcoated" to describe the position of a layer with respect to a substrate or other element of an article of the present disclosure, we refer to the layer as being atop the substrate or other element, but not necessarily contiguous to either the substrate or the other element.

By using the term "separated by" to describe the position of a layer with respect to other layers, we refer to the layer as being positioned between two other layers but not necessarily contiguous to or adjacent to either layer.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

It has been found that initial layer formation without curling can be achieved by fusing ("sintering") the initial (co)polymer layer onto a substrate material that is not a powder and that is of a different material than the initial (co)polymer layer. Contrary to creating the initial layer within the powder bed the initial layer is constrained in its planar direction which prevents or reduces curling of the first and subsequent layers. This concept is referred to as herein as "constraint sintering".

Figure 1B:
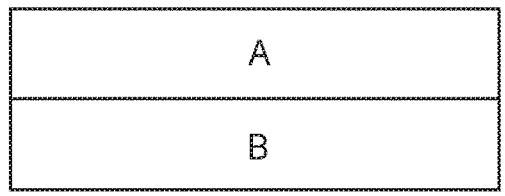

A sketch illustrating constrained sintering is shown in FIG. 1A and FIG. 1B. 1. In FIG. 1A, film A is not connected to an underlying substrate B, i.e. they are not joined thus resulting in different strain and no in-plane tensile stress. Consequently, shrinkage can occur not only perpendicular to the plane of the film A but also in-plane. In FIG. 1B, the film A is connected to the underlying substrate B thus resulting in a same strain and in-plane tensile stress. Now shrinkage can only occur perpendicular to the plane of the film A.

By providing a substrate onto which the (co)polymer is fused during the formation of the first layer articles can be produced at low temperatures or even at room temperature. Bringing the (co)polymer powder above its crystallization temperature, for example by heating the powder or the processing chamber, is not necessary. The article to be produced can be directly built onto the substrate material without the need of creating support structures, i.e. structures generated by SLS from the same (co)polymer but that are not intended to form a part of the final article but are meant to be removed from the article generated.

The powdered (co)polymer material is provided in sufficient thickness over the substrate such that the first layer is fused onto the substrate. Typically, the layer is sufficiently thin, and may, for example, be a single layer. The single layer thickness may be made up by the particle size of the powder, preferably the (co)polymer particles. In some exemplary embodiments, the powder for producing the first layer ("first powder") is homogeneous and contains only the (co)polymer. Once the first layer has been deposited onto the substrate subsequent layers may be built using the same powder or one or more different powders ("second powder"). Typically, the first layer deposited onto the substrate may be the first layer of the final article to be built.

The first and subsequent layers are deposited by fusing the (co)polymer in the first or second powder by exposure to an energy beam, typically a laser beam, at desired and preprogrammed locations. The energy beam is selected such that the energy it generates is sufficient to fuse the (co)polymer particles onto the substrate layer or subsequent layers at the desired locations.

The substrate is a solid material that is not a powder and is selected such that it allows for the formation of (co)polymer layers on its surface. Various materials may be used depending on the powder selected for additive manufacturing and the energy applied and will be described in greater detail below but typically the substrate is made of a different material than the first (co)polymer, or at least the surface of the substrate onto which the first (co)polymer is to be fused is made of a different material than the first (co)polymer.

In some exemplary embodiments the production process is carried out at ambient temperature (e.g., room) temperature, typically 20-30° C.

The present disclosure describes an additive layer manufacturing method for manufacturing a solid article. The additive manufacturing method of the present disclosure creates an article by repeated fusing particle in a powder to form layers in a controlled way to create an article. Preferably, the additive manufacturing method is selective laser sintering, which means the particles are fused upon exposure to one or more laser beams.

The method according to the present disclosure is carried out in an additive manufacturing device. An additive manufacturing device for SLS as known in the art can be used. Such devices typically contain a processing chamber. The processing chamber contains at least one container for receiving the powder for additive processing. The container for receiving the powder for processing is referred to herein also as "base plate" or "powder bed". The base plate may be moved upwards or downwards in a controlled manner to allow for new powder to be placed into the base plate.

The device includes at least one energy source that provides an energy beam, e.g. a laser beam, that can be directed at desired locations on the base plate to allow the formation of layers by fusing the (co)polymer particles in the powder at desired locations.

The method of the present disclosure includes the step of providing at least one layer of a first powder onto the substrate. The substrate is placed in the container receiving the powder of the processing chamber of the device. The substrate can be removed from the container after the first layers has been deposited onto the substrate or after the article has been produced or it can be removably attached to the container The first powder comprises at least one first (co)polymer. The method further includes the step of fusing the first (co)polymer at a desired location in the powder to deposit the first (co)polymer onto the substrate and to provide at least a first layer deposited onto the substrate. The first layer may be continuous or discontinuous and may describe a pattern. The first layer may only be created in selected areas of the substrate. Powder that was not exposed to the energy beam remains in its powdered state, i.e. is unfused and can be removed if needed.

The method further includes the step of depositing successive layers onto the at least first layer to create an article as is done in conventional additive manufacturing using powders, for example in SLS. Fusing in this context means fusing or melting the (co)polymer comprised in the powder. In the case where the powder comprises the abrasive particles described below or other particles that do not melt/fuse upon exposure to the energy beam, the (co)polymer may not only fuse to a previously formed (co)polymer layer but may also fuse to these particles and may solidify onto the particles after fusing. In some cases the powder may comprise a blend of powders, for example, a first powder comprising a first (co)polymer, and one or more additional powders comprising other (co)polymers, inorganic particulates, mixtures thereof and combinations thereof.

The process can be carried out in the appropriate conventional additive processing devices, e.g. SLS printers. An advantage of the methods disclosed herein over conventional SLS processing is that the processing can be carried out at low temperatures, for example below 75° C. or even at room temperature (20° C.), for example between 15° C. and 50° C. The additive processing, preferably, is carried out without any additional heating, meaning any heating other than the heat generated by the energy source, e.g. the laser beam to fuse the (co)polymer particles.

The processing chamber and/or the powder prior to fusing and/or the article and/or the substrate can be kept at such low temperatures, for example at temperatures below the crystallization temperature of a crystalline or semi-crystalline (co)polymer to be processed. In some exemplary embodiments, the processing chamber and/or the powder and/or the substrate are not heated during manufacturing of the article and/or not preheated before manufacturing of the article by additional heating. In some exemplary embodiments, the processing chamber and/or the substrate and/or the powder in the powder bed prior to fusing have a temperature below 75° C., during manufacturing the article.

Preferably, the processing chamber and/or the powder prior to fusing and/or the article and/or the substrate have a temperature below 70° C. In some exemplary embodiments, the processing chamber and/or the powder prior to fusing and/or the article and/or the substrate have a temperature below 65° C. In some exemplary embodiments, the processing chamber and/or the powder prior to fusing and/or the article and/or the substrate have a temperature below 60° C. In some exemplary embodiments, the processing chamber and/or the powder prior to fusing and/or the article and/or the substrate have a temperature below 55° C.

In some exemplary embodiments, the processing chamber and/or the powder prior to fusing and/or the article and/or the substrate have a temperature below 45° C. In some exemplary embodiments, the processing chamber and/or the powder prior to fusing and/or the article and/or the substrate have a temperature below 40° C. In some exemplary embodiments, the processing chamber and/or the powder prior to fusing and/or the article and/or the substrate have a temperature below 35° C. In some exemplary embodiments, the processing chamber and/or the powder prior to fusing and/or the article and/or the substrate have a temperature below 30° C. In some exemplary embodiments, the processing chamber and/or the powder prior to fusing and/or the article and/or the substrate have the aforementioned temperatures during the manufacturing of the solid article.

In certain exemplary embodiments, the processing chamber and/or the powder prior to fusing and/or the article and/or the substrate have a temperature between 0° C. and 75° C. In some exemplary embodiments the processing chamber and/or the powder prior to fusing and/or the article and/or the substrate have a temperature between 5° C. and 70° C. In some exemplary embodiments, the processing chamber and/or the powder prior to fusing and/or the article and/or the substrate have a temperature between 5° C. and 60° C. In some exemplary embodiments, the processing chamber and/or the powder prior to fusing and/or the article and/or the substrate have a temperature between 10° C. and 50° C. In some exemplary embodiments, the processing chamber and/or the powder prior to fusing and/or the article and/or the substrate have a temperature between 10° C. and 45° C. In some exemplary embodiments, the processing chamber and/or the powder prior to fusing and/or the article and/or the substrate have a temperature between 10° C. and 40° C. In some exemplary embodiments, the processing chamber and/or the powder prior to fusing and/or the article and/or the substrate have a temperature between 10° C. and 35° C.

In further exemplary embodiments, the processing chamber and/or the powder prior to fusing and/or the article and/or the substrate have a temperature between 10° C. and 30° C. In some exemplary embodiments, the processing chamber and/or the powder prior to fusing and/or the article and/or the substrate have a temperature between 10° C. and 25° C. In some exemplary embodiments, the processing chamber and/or the powder prior to fusing and/or the article and/or the substrate have the aforementioned temperature ranges during the manufacturing of the solid article.

First Powder

The first powder for use in the methods described herein contains at least one first (co)polymer. The (co)polymer is in powdered form, which means it is present as fine particles. Typically, the (co)polymer particles have a particle size of less than 500 μm (e.g. $D_{100}$<500 μm), preferably less than 300 μm (e.g. $D_{100}$<100 μm) and more preferably less than 100 μm (e.g. $D_{100}$<100 μm). Typical particle sizes include average particles sizes from 5 to 150 μm ($D_{50}$). The particle size is determined by the longest axis of the particle. The particle size can be determined by laser diffraction in a particle analyzer. Polymer particles of this size are commercially available or can be prepared, for example, by milling and sieving as known in the art.

Preferably, the particles are spherical or substantially spherical (aspect ratio preferably is from 0.5 to 1.5).

The first powder may contain at least 45% by weight of (co)polymer, preferably at least 50% by weight and in some embodiments the powder contains up to 100% of (co)polymer. For example, the powder may contain from 45% by weight to 65% weight, or from 55 by weight up to 85% by weight of (co)polymer, preferably total amount of (co)polymers and more preferably of a (co)polymer described below. The first powder, for example, may contain from about 60% by volume up to about 100% by volume, from example from 70% by volume to 95% by volume of a (co)polymer, more preferably of a (co)polymer described below.

Polymers

The first powder for use in the methods according to the present disclosure contain at least one first (co)polymer. In one embodiment the first (co)polymer preferably is a soft or flexible (co)polymer, i.e. a (co)polymer having a high elongation at break. For example, the method may be particularly suitable for processing powders comprising a first (co)polymer that is a thermoplastic (co)polymer having a shore D hardness (ISO 868) below 70, preferably below 50, for example below 45 or 40 or even below 38. Preferably, the first (co)polymer is a thermoplastic (co)polymer having an elongation at break of at least 200%, preferably at least 450%, more preferably at least 500%, most preferably at least 600% (DIN EN ISO 527-1, test speed 50 mm/min). In some exemplary embodiments, the first (co)polymer is a thermoplastic (co)polymer having a flexural modulus of less than 100 MPas (ISO 6721-1).

In one exemplary embodiment the first (co)polymer is a thermoplastic polyurethane, for example an at least partially crystalline polyurethane, preferably having a shore D hardness as described above, more preferably having a shore D hardness and an elongation at break and or a flexural modulus as described above.

The at least partially crystalline, i.e. thermoplastic (co)polymers may have a melting point between about 78° C. and 300° C., for example between 95° C. and 280° C.

In another exemplary embodiment the first (co)polymer is a curable (co)polymer, i.e. a (co)polymer that can be cross-linked, for example by applying heat, radiation or by mixing with a curing catalyst and activating the curing catalyst. Curable (co)polymers include, for example, curable acrylic resins, i.e. (co)polymers with one or more acrylic and methacrylic functional groups, preferably end groups; curable epoxy resins, i.e. (co)polymers with one or more epoxy groups, preferably end groups; curable polyesters and vinyl esters with unsaturated sites at the ends or on the backbone and combinations thereof. In one embodiment, the curable (co)polymer is a fluoropolymer, e.g. a curable fluoroelastomer. Typical examples of curable fluoroelastomers include (co)polymers having repeating units derived from vinylidene fluoride (VDF) and one or more other unsaturated perfluorinated olefins or unsaturated olefinic ethers like perfluorinated alkyl vinyl ethers or perfluorinated alkyl allyl ethers. In a preferred embodiment the curable (co)polymer is a thermoset, i.e. a (co)polymer that is cross-linked by application of heat only, i.e. without requiring curing catalysts or curing systems. In some exemplary embodiments the curable (co)polymer is an epoxy resin, i.e. a curable (co)polymer having at least one epoxy end group.

The first (co)polymer according to the present disclosure is present in the powder as particles, for example particles having a particle size of less than 500 μm (e.g. $D_{100}$<500 μm), preferably less than 300 μm (e.g. $D_{100}$<100 μm) and more preferably less than 100 μm (e.g. $D_{100}$<100 μm). Typical particle sizes include average particles sizes from 5 to 150 μm ($D_{50}$). Particle size is determined by the longest axis of the particle. The particle size can be determined by laser diffraction in a particle analyzer. Polymer particles of this size are commercially available or can be prepared, for example, by milling and sieving as known in the art.

In one particular embodiment the first (co)polymer is a fluoropolymer, for example a fluorothermoplastic fluoropolymer having a shore D hardness as described above and more preferably having an elongation at break and/or a flexural modulus as described above. The fluoropolymer preferably is a tetrafluoroethene (TFE)-based fluoropolymer and comprises at least 25% by weight of units derived from TFE. The fluoropolymer further comprises at least 1.5% by weight of units derived from one or more perfluorinated or partially fluorinated or non-fluorinated alpha olefin and combinations thereof. Examples for perfluorinated alpha olefins include Examples for such optional comonomers include fluorinated monomers selected from perfluorinated $C_3$-$C_8$ olefins, in particular, hexafluoropropene (HFP) and alpha olefin ethers, in particular those corresponding to the formula. Examples of perfluorinated unsaturated ether monomers that may be used include those corresponding to the formula (I):

$$CF_2=CF-(CF_2)_n-O-Rf \quad (I)$$

wherein Rf represents a perfluorinated aliphatic group that may contain one or more oxygen atoms and n is either 0 or 1. In case n is 0 the ethers are referred to as vinyl ethers (perfluorinated alkyl vinyl ethers or PAVEs). When n is 1 the ethers are referred to as allyl ethers (perfluorinated alkyl allyl ethers or PAAEs). In some exemplary embodiments, Rf corresponds to

$$(R'fO)_n(R''fO)_mR'''f \quad (II)$$

wherein R'f and R''f are different linear or branched perfluoroalkylene groups of 2-6 carbon atoms, m and n are independently 0-10, and R'''f is a perfluoroalkyl group of 1-6 carbon atoms. Particular examples include but are not limited to perfluoro(2-propoxypropyl vinyl) ether (PPVE-2), perfluoro(methyl vinyl) ether (PMVE), perfluoro(3-methoxy-n-propyl vinyl) ether, perfluoro(ethyl vinyl ether) (PEVE), perfluoro(2-methoxy-ethyl vinyl) ether, perfluoro (n-propyl vinyl) ether (PPVE-1) and $F_3C-(CF_2)_2-O-CF(CF_3)-CF_2-O-CF(CF_3)-CF_2-O-CF=CF_2$.

Examples of partially fluorinated monomers include vinylidene fluoride, vinylfluoride, and chlorotrifluoroethene (CTFE) and the unsaturated ethers according to formula (I) and (II) above with the difference that Rf is partially fluorinated, which means at least one fluorine atom has been replaced by a hydrogen atom.

Examples of non-fluorinated alpha olefins include ethene (E) and propene (P).

Suitable fluoropolymers typically have a melt flow index (MFI) at a 5 kg load at a temperature of 372° C. of from about 100 to 15 g/10 mins (DIN EN ISO 1133-1:2012-03; standardized extrusion die of 2.1 mm in diameter and a length of 8.0 mm).

In some exemplary embodiments the fluoropolymers contain units derived from the copolymers selected from TFE, HFP, and VDF and may or may not contain units derived from unsaturated ethers according to formula (I). In another embodiment, the comonomers are used to make a copolymer having repeating units derived from vinylidene fluoride, tetrafluoroethene, hexafluoropropene, and optionally an unsaturated ether according to formula (I) above, preferably a perfluoro(propyl vinyl ether) or perfluoro(methyl vinyl ether). In general, the comonomer units in the ranges of 10 mol % to 60 mol % vinylidene fluoride comonomer units, 30 mol % to 80 mol % tetrafluoroethene comonomer units, 3 mol % to 20 mol % hexafluoropropene comonomer units, and 0 mol % to 2 mol % of the one or more unsaturated ether according to formula (I), preferably a perfluoro(propyl vinyl ether), a perfluoro(ethyl vinyl ether), a perfluoro(methyl vinyl ether) or a combination thereof. In another embodiment, the fluoropolymer contains units derived from the comonomer combination comprising TFE and ethene; TFE, HFP and ethene; TFE and propene; TFE, HFP and propene; TFE, HFP, and one or more unsaturated ethers according to formula (I) above; TFE, HFP and VDF; TFE-VDF; TFE-PAVE; TFE-PAAE; and TFE-PAVE-PAAE.

In other exemplary embodiments the fluoropolymers are selected from thermoplastic fluoropolymers having a melting point of less than 150° C. The low melting thermoplastic fluoropolymers may have a melt-flow index under a 5 kg load at 265° C. (MFI 265/5) of from about 3 to 70 g/10 mins (DIN EN ISO 1133-1:2012-03; standardized extrusion die of 2.1 mm in diameter and a length of 8.0 mm). Typically, the (co)polymers contain units derived from TFE and one or more unsaturated ether as described above in formula (I) and may also contain units derived from the optional comonomers described above, in particular units derived from HFP and/or units derived from vinylidene fluoride. In one embodiment, the fluoropolymers contain units derived from the comonomers TFE, HFP and one or more non-fluorinated comonomers like ethene and propene but no units from an unsaturated ether. In another embodiment the fluoropolymers contain units derived from the comonomers TFE, HFP and vinylidene fluoride but no units from an unsaturated ether.

The methods according to the present disclosure further use a second (co)polymer. The second (co)polymer may be a (co)polymer selected from the (co)polymers described above for the first (co)polymer. The second (co)polymer may be the same (co)polymer as the first (co)polymer.

In another embodiment of the present disclosure the first and/or second powders may additionally contain at least one additional (co)polymer selected from a polyamide and/or a polypropylene.

Inorganic Particles:

In some exemplary embodiments the powder further comprises inorganic particles. In some exemplary embodiments, the particles are abrasive particles and have a Mohs hardness of at least 4, preferably at least 5, more preferably at least 6, more preferably at least 7, more preferably at least 8, more preferably at least 8.5, more preferably at least 9, and more preferably 9.5.

Preferably, the abrasive particles have hardness greater than or equal to that of aluminum oxide. In some exemplary embodiments, the abrasive particles have hardness greater than or equal to that of silicon carbide.

In some exemplary embodiments, the particles comprise or consist of aluminum oxide, preferably sintered aluminum oxide, silicon carbide, boron carbide, boron nitride and diamonds.

In certain exemplary embodiments, the particles are agglomerates of at least one of aluminum oxide particles, silicon carbide particles, boron carbide particles, boron nitride particles, and diamond particles. In some exemplary embodiments, the agglomerates have a binder phase.

In some particular exemplary embodiments, the particles have an average particle size less than 300 µm (e.g. D100<300 µm), preferably less than 200 µm, preferably less than 150 µm, preferably less than 100 µm, preferably less than 50 µm, preferably less than 25 µm. In some exemplary embodiments, the abrasive particles have an average particle size less than 100 µm in at least one lateral dimension, preferably less than 80 µm in at least one lateral dimension, more preferably less than 50 µm in at least one lateral dimension.

Preferably, the concentration of the inorganic particles in the powder is below 35 vol %. For example, the concentration of the inorganic particles in the powder may be up to 30 vol %, or up to 22 vol %, or up to 20 vol %, and, more preferably, up to 15 vol %. In one embodiment the concentration of the inorganic particles in the powder is between 15 and 35 vol %.

Second Powder:

The second powder comprises at least one (co)polymer. The (co)polymer includes the one or more (co)polymer described above. The second powder may also include the additional presence of a polypropene and/or a polyamide. The second powder may also contain the abrasive particles described above. In fact, in one embodiment the second powder may be the same powder as the first powder. In another embodiment, the second powder may be different from the first powder, for example different in its composition, concentration, particle size and combinations thereof.

The at least second powder may also comprise the abrasive particles described above or it may not comprise them and may be free of abrasive particles. The abrasive particles comprised in the first powder may be the same as in the second powder but differ in concentration. The abrasive particles may differ in their shape but have the same composition, or may differ in composition and shape. Or, the abrasive particles in the first and second powder may be identical but the (co)polymers in the first and second powder differ in concentration or in composition or both. For example, the abrasive particles comprised in the first powder can be diamond particles and the abrasive particles comprised in the at least one further powder can be aluminum oxide particles.

The method of the present disclosure comprises the step of depositing successive layers from the second powder, wherein each successive layer is selectively fused prior to deposition of the subsequent layer. The second powders used for the successive deposition of layers may be identical of differ, i.e. the successive layers may be identical or different in composition.

Substrate:

The substrate for receiving the first (co)polymer is shaped and dimensioned such that a first layer from the first powder can be fused onto it and ideally is of sufficient size that it can be easily removed from the base plate. The substrate is not a powder but typically in the form of a sheet or another flat body. For example, the substrate may have a length and/or width of at least 1 cm. Typically, the length and the width of the substrate are larger than its thickness (height). The dimensions refer to the position of the substrate in the processing chamber (i.e. the plane of length and width are parallel to the surface that receives the first (co)polymer. The thickness is orthogonal to that plane.

The substrate may be a stiff or a flexible material. The substrate may be simply placed into the container for receiving the powder and can be removed from it when the article has been produced, for example it is of sufficient stiffness, size and or weight. Alternatively, or in addition, the substrate can also be attached directly or indirectly (via one or more other materials) to the base plate, i.e. to the container for receiving the powder, in particular when the substrate is flexible. The attachment is releasable, i.e. the substrate material can be removed from the container.

The substrate may contain at least one adhesive by which it can be releasably attached to the base plate, wherein the attachment may be directly or indirectly. Releasably attached means that the bond can be cleft without destroying the article. Suitable adhesives include pressure-sensitive adhesives, for examples those used in adhesive tapes. In some exemplary embodiments, the substrate can also be removed from the finished article, for example by dissolving it in a liquid, or an acid or a base, by thermal degradation using conditions that do not degrade or affect the finished article, or simply by peeling it off from the article if the bond between article and substrate is weak enough, or by other mechanical means, for example grinding it off the article.

The substrate is of a different material than the first (co)polymer, or at least the surface of the substrate for receiving the first (co)polymer is of a different material than the first (co)polymer. Various materials can be used as substrates and may be optimized with respect to the (co)polymer to be processed, the thickness of the layer provided onto the substrate and the energy produced by the energy beam. The materials are selected such that the (co)polymer of the first powder fuses onto the substrate and forms an initial layer on the substrate. For hydrophobic materials a hydrophobic surface may be chosen and for hydrophilic materials a polar or hydrophilic surface may be used advantageously.

The substrate a onto which the first layer comprising a first (co)polymer layer a described herein is to be deposited may contain a material selected from a metal or a combination of metals; (co)polymers, organic woven or non-woven material, inorganic woven or non-woven material and combinations thereof; a ceramic or a combination of ceramics. Organic woven and non-woven material comprises organic fibers comprising, for example, polyester, polyamides, celluloses, organic non-woven materials include paper, and crepe paper. Suitable inorganic fibers include glass fibers, metal oxide fibers like ceramic fibers. The woven or non-woven material may comprise coating material, binder materials, adhesives and a combination thereof. The surface of the substrate may also contain one or more adhesives.

In one exemplary embodiment the substrate is a metal or contains a metal layer at its surface. The metal substrate may be simply placed on the base plate or, preferably, it may be attached to the base plate by at least one adhesive. Adhesive tapes with metal surface may also be used. Suitable metal includes, aluminum, steel, silver, gold.

In another embodiment the surface of the substrate comprises inorganic non-fibrous materials, for example a sintered inorganic material.

In another embodiment the surface of the substrate comprises a non-woven organic material comprising fibers containing one or more cellulose, one or more polyester, one or more polyamide and a combination thereof.

In some embodiments, the substrate has a surface suitable for receiving particles of the first (co)polymer such that the particles of the first (co)polymer can be fused onto it to form an uncurled layer. The substrate surface may be adapted to the chemical nature of the first (co)polymer. For example, a hydrophilic surface may be selected for polar and hydrophilic (co)polymers, whereas a more hydrophic surface may be selected for more hydrophobic and unipolar (co)polymers.

The surface of the substrate may also have regular or irregular structures that allow for particle deposition onto it. For example, the surface may comprise a plurality of grooves and/or ridges or of pores and domes and combinations thereof. In one embodiment, the surface contains a plurality of raised and/lowered areas having at least one longest dimension of from about 1/10 up to about 3 times the size of the particles of the first (co)polymer. Preferably, the first (co)polymer comprises particles having a size of 1 µm to 500 µm, more preferably from 3 µm to 300 µm.

In one particular embodiment the substrate is an adhesive tape, preferably a masking tape. Masking tapes typically have a surface comprising crepe paper or similar materials with a regular or irregular structural pattern.

In another aspect the present disclosure also relates to an additive layer manufacturing method for manufacturing a solid article, preferably, selective laser sintering. The method comprises: (i) providing a layer of a powder, the powder comprising at least one powdered (co)polymer as described above; (ii) depositing successive layers of the powder and selectively fusing each layer prior to deposition of the subsequent layer to form an article, wherein the powder further comprises one or more abrasive particles as described above. In some exemplary embodiments a substrate is used as described above, but the method may also be carried out without a substrate in which case a temperature above the crystallization temperature of the (co)polymer should be applied, at least when creating the first layer of the article.

The present disclosure also relates to an article being manufactured by any one of the aforementioned exemplary methods. In particular, the present disclosure relates to a finishing tool comprising an article containing abrasive particles that was obtained by a method according to the present disclosure.

Some exemplary embodiments will now be described with reference to the drawings and examples with intending to limit the present disclosure to the drawings and examples.

Figure 2:
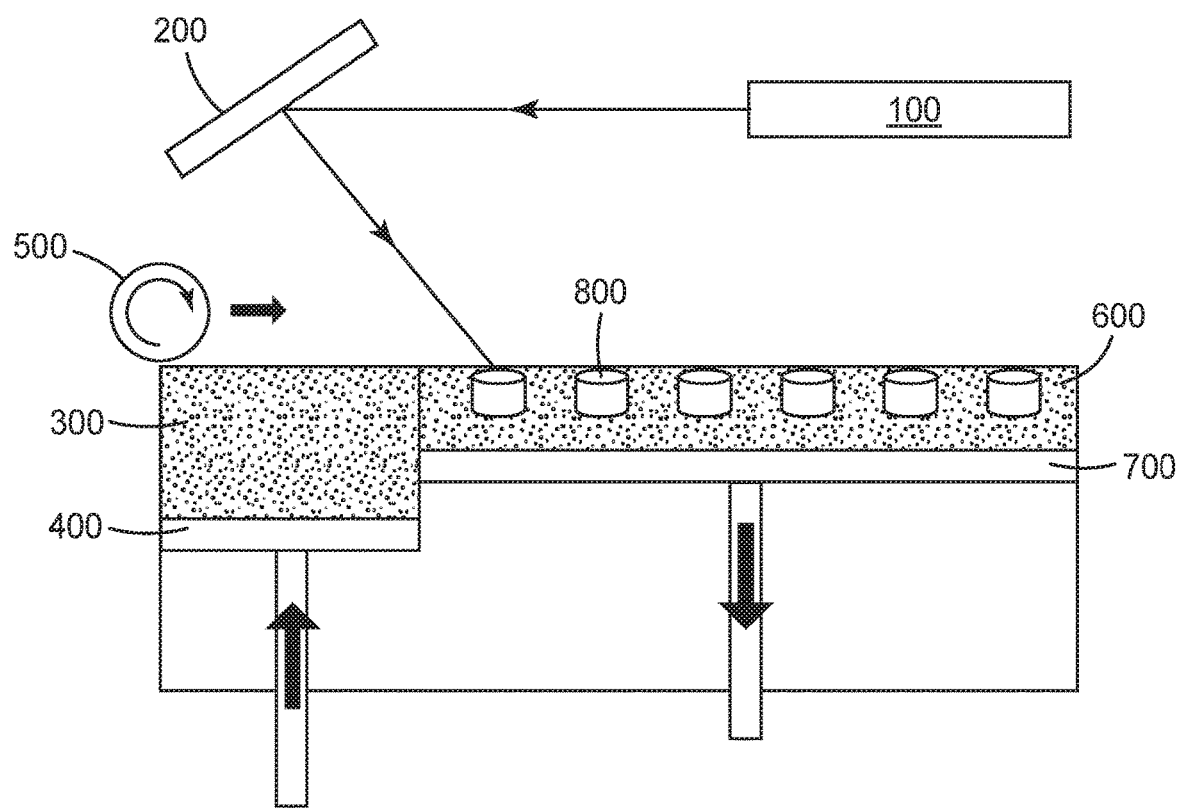
FIG. 2 illustrates a selective laser sintering machine.

Turning now to FIG. 2, a typical conventional SLS device is illustrated. The selective laser sintering device comprises a laser 100, usually a $CO_2$ laser, a scanning mirror 200, a powder reservoir 300 and a part-built bed 600.

The powder reservoir 300 comprises the powder to be fused to form the desired article 800. The bottom plate 400 of the powder reservoir 300 is moveable upwards and downwards for example by means of an appropriate piston. When the piston moves upwards together with the bottom plate 400 of the powder reservoir 300, the powder will be provided to the part-built bed 600 by a leveling roller 500. The laser beam of the laser 100 is used to selectively fuse the powder in a desired and/or preprogrammed pattern by scanning with the scanning mirror 200 across the surface of the powder layer in the part-built bed 600. After the layer is scanned and the fused powder has solidified, the baseplate 700 of the part-built bed 600 is lowered by the equivalence to the thickness of one (co)polymer layer to prepare the growth of the next layer. The process is repeated until the article 800 is formed.

Usually, the process chamber of the SLS device is heated during the manufacturing of the article and/or preheated before the manufacturing of the article 800. In particular, the powder in the powder reservoir 300 is heated during the manufacturing of the article 800 and also preheated before the manufacturing. In addition, after the manufacturing of the article 800, the article or the entire device may be cooled down. Usually, the heating is achieved by heating means, e.g. quartz heat lamps inside the processing/sintering chamber and/or by heating the bottom plate 400 and the side walls of the reservoir 300 and/or heating the baseplate 700 of the part-built bed 600.

Figure 3:
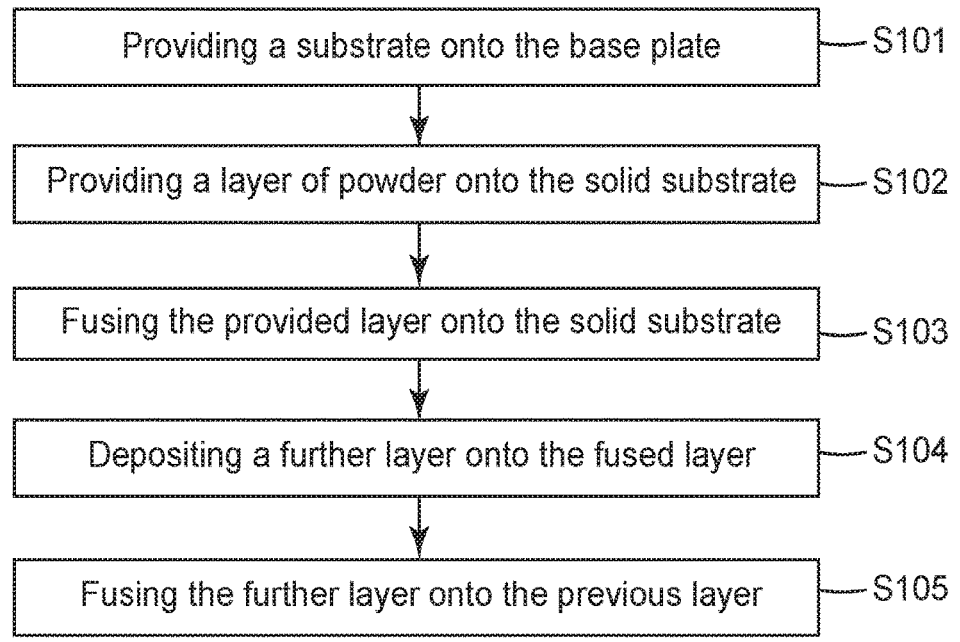
FIG. 3 illustrates a flowchart according to an exemplary embodiment of a method of the present invention.

FIG. 3 illustrates a flow chart according to an exemplary embodiment of a method of the present invention. In principle, a convention SLS machine may be used to carry out the invention but the substrate material is placed into the container for receiving the powder bed.

Figure 4:
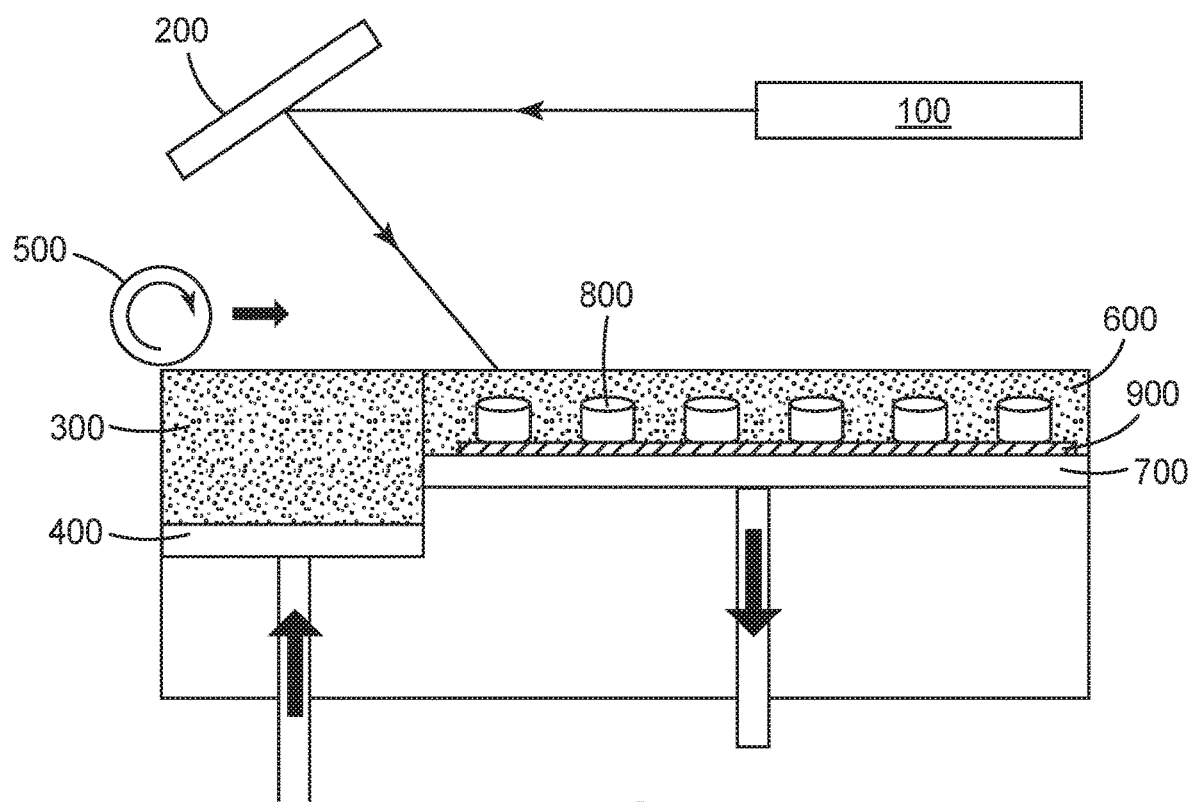
FIG. 4 illustrates a selective laser sintering machine used according to an exemplary embodiment of a method of the present invention.

In a first step S101, the substrate material 900 is provided onto the baseplate 700 (see also FIG. 4; substrate 900). The size of the substrate, or at least its surface typically is at least of equal size to the first layer of the article to be produced by additive manufacturing. It is also possible to provide several substrates instead of a single one.

In a second step S102, the bottom plate 400 is moved upwards by the leveling roller 500, and a layer of powder is provided directly onto the solid substrate 900 in the part-built bed 600.

In a third step S103, the layer which has been provided directly onto the substrate 900 is fused onto the substrate 900 in a desired pattern by an energy beam 100 typically in a computer controlled pattern. The additive manufacturing device typically comprises a laser 100, usually a $CO_2$ laser. In the examples below a ROFIN STARSHAPESSH-300 300 W $CO_2$ laser was used.

In a next step S104, a further layer is deposited onto the fused layer onto the substrate 900.

In a fifth step S105, the further layer of powder is fused in a desired pattern onto the previous layer.

By repeating steps S104 and S105, the desired article 800 is built up layer by layer.

Unlike in the prior art, according to this exemplary embodiment, no heating may be performed during the manufacturing process of the article so that the processing chamber and the unfused powder, i.e. the powder prior to fusing, may have room temperature during the production of the article. In particular, the baseplate below the substrate material may not be heated and substrate and the article to be produced may also have room temperature as well.

However, if desired heating may be applied, for example to the processing chamber, the unfused powder, and/or the article and/or even the substrate during the manufacturing. Moderate heating can facilitate the fusing process, as only the energy necessary to fuse the (co)polymer has to be generated by the laser 100. However, the temperature of the processing chamber, the unfused powder and/or the article and/or even the substrate should not reach a temperature at which the (co)polymers ages or degrades. Therefore, if heating is applied, there may be a trade-off between facilitating fusing and degradation of the (co)polymer.

Moreover, it has been surprisingly found that unlike in conventional SLS the powders provided in this disclosure can be processed at comparably low temperatures or even ambient temperature. According to an exemplary embodiment, the temperature of the processing chamber, the unfused powder and preferably the article is below 75° C., preferably room temperature. In addition, no inert gas is necessary during the manufacturing.

Commercial laser sintering devices may be used, examples include but are not limited to the FORMIGA P110 and EOSINT P800, both manufactured by EOS North America (Novi, Mich.).

The operation of the processes of the present disclosure to produce nonwoven fibrous webs as described herein, will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in view of the number of reported significant digits and by applying ordinary rounding techniques.

Example 1

An article was produced in an SLS printer using a ROFIN STARSHAPESSH-300 300 W $CO_2$ laser (available from Coherent-Rofin Co., Sunnyvale, Calif., USA) following the method illustrated in the flowchart of FIG. 3. The substrate material (a masking tape, for example General Purpose Masking Tape 203 commercially available from 3M Company, St. Paul Minn., USA) was adhered directly onto the baseplate.

The powder was a thermoplastic polyurethane powder (TPU); LUVOSINT X92A-1 from Lehmann & Voss Co., Pawcatuck, Conn., USA (particle size<150 mp of 160° C. ISO 11357, shore A of 88, ISO 868, Flexural Modulus, 20° C. ISO6721-1 27 MPa, elongation at break of 500%, DIN 53504). No heating was performed during, before or after the manufacturing process and the processing chamber and the powder prior to fusing had room temperature. The baseplate below the substrate material was not heated before, during or after manufacturing the article. No inert gas was used during the manufacturing.

Figure 5:
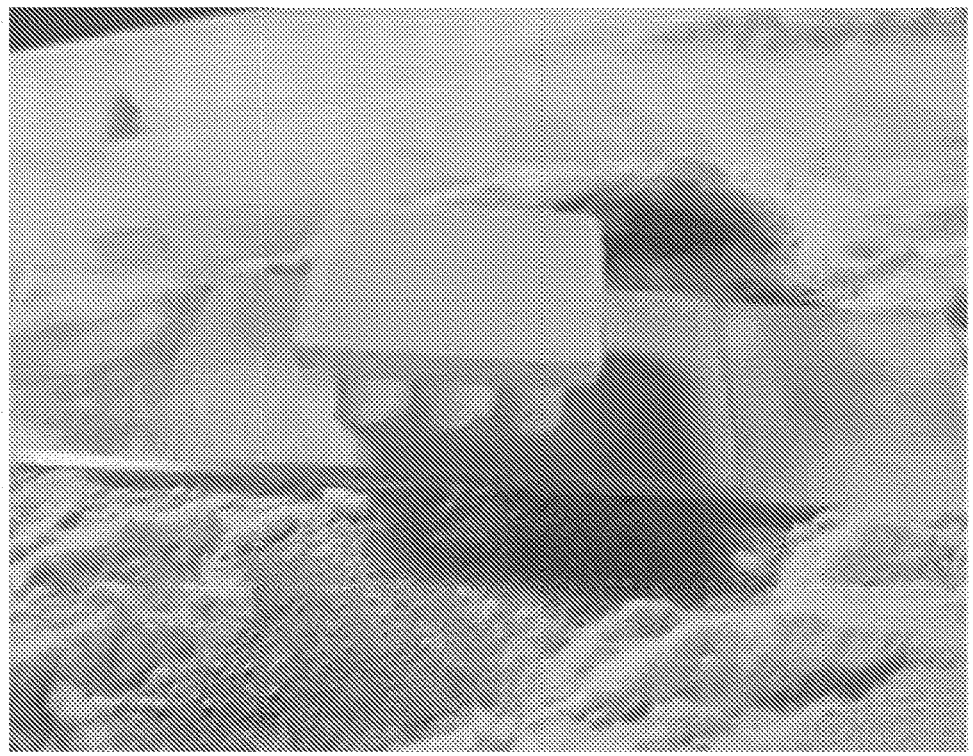
FIG. 5 illustrates a picture of an article produced by a method of the present invention.

An article comprising several pins on a baseplate was created by first printing 75 layers to form pins, then 25 layers to form pins and a baseplate and finally 25 layers of the baseplate geometry for good connection between the pins and the plate. A picture of the article produced in example 1 is shown in FIG. 5. This example shows that complex 3D parts were created at room temperature without any curling or other defects.

Example 2

Figure 6:
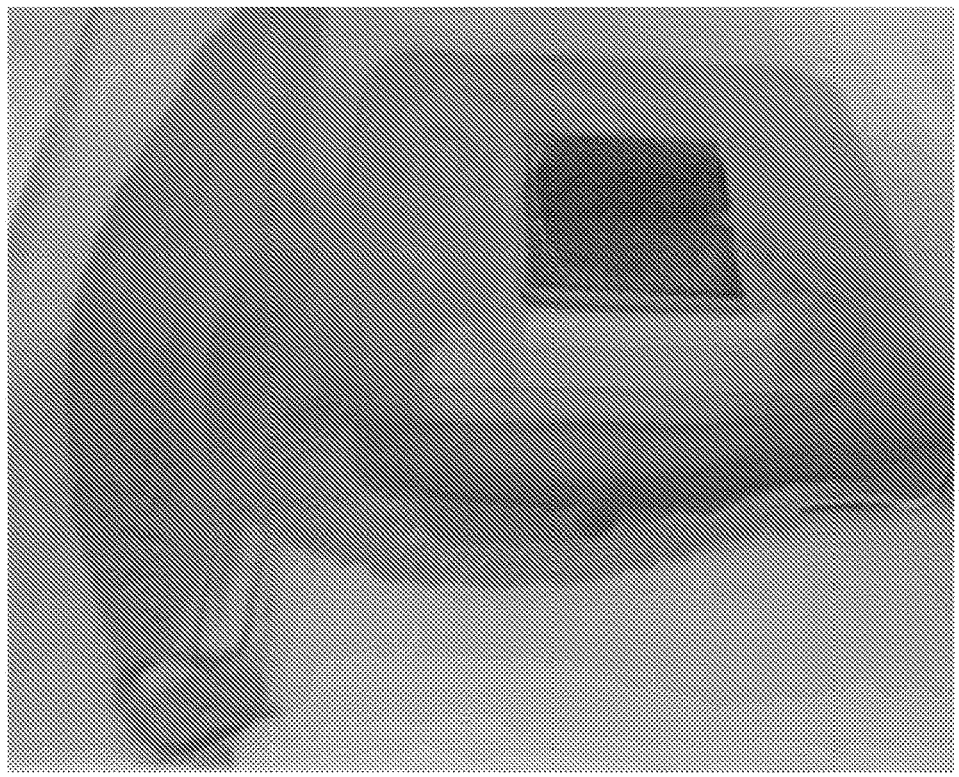
FIG. 6 illustrates a picture of an article produced by a method of the present invention.

Example 1 was repeated but instead of the TPU an epoxy resin (thermoset; SCOTCHKOTE® FUSION-BONDED EPDXY COATING 6233 8G from 3M Company, St. Paul, Minn., USA) was used. A rectangular article was produced by printing 20 layers onto the substrate material (adhesive tape). A picture of the article produced in Example 2 is shown in FIG. 6.

Example 3

Example 1 was repeated but instead of the TPU of example 1 a powder containing the TPU and an agglomerate of the TPU binder and each of two kinds of abrasive particles (Diamond MBM from Sandvik-Hyperion, Fair Lawn N.J., USA, with an average particle size of 6 to 12 μm, and sintered aluminum oxide particles commercially available as CUBITRON® II from 3M Company, St. Paul, Minn., USA). Finishing tools were produced in Example 3.

The finishing tools were affixed to a rotary mandrel. Polishing tests were performed on 150 mm² sections of FILTEK® Supreme Ultra (FSU) (available from 3M Company, St. Paul, Minn., USA) nanocomposite coupons, a dental composite restorative material available from 1. The FSU test coupons were mounted on a Mettler Toledo Model SG16001 (available from Mettler Toledo Co. Columbus, Ohio, USA) balance such that the operator can control the force for each run. For each test water was sprayed onto the test area to cover it in water. The tool was mounted in a NSK Z500 low speed handpiece and spun at 10,000, or 15,000 RPM, while pressing at the desired test force (usually 75 g or 100 g).

During testing, the tool was held so that the axis of rotation was approximately parallel to the surface of the FSU coupon. The polishing tool was moved back and forth, and in spirals around the 150 mm² surface area for 60 seconds without pausing in any one spot, and then stopped.

Figure 7:
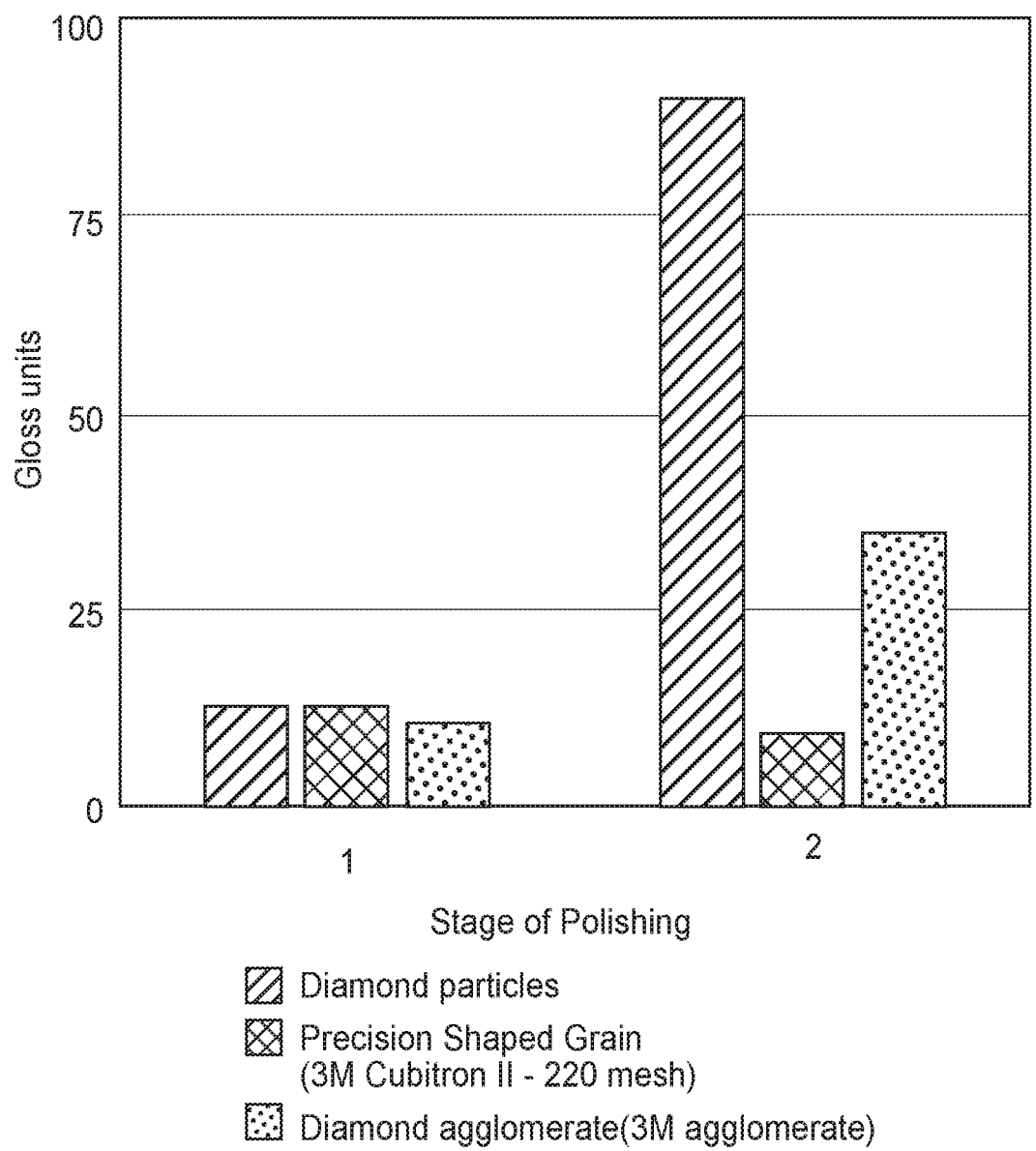
FIG. 7 illustrates the result of a gloss test of different articles produced by a method of the present invention.
Figure 8:
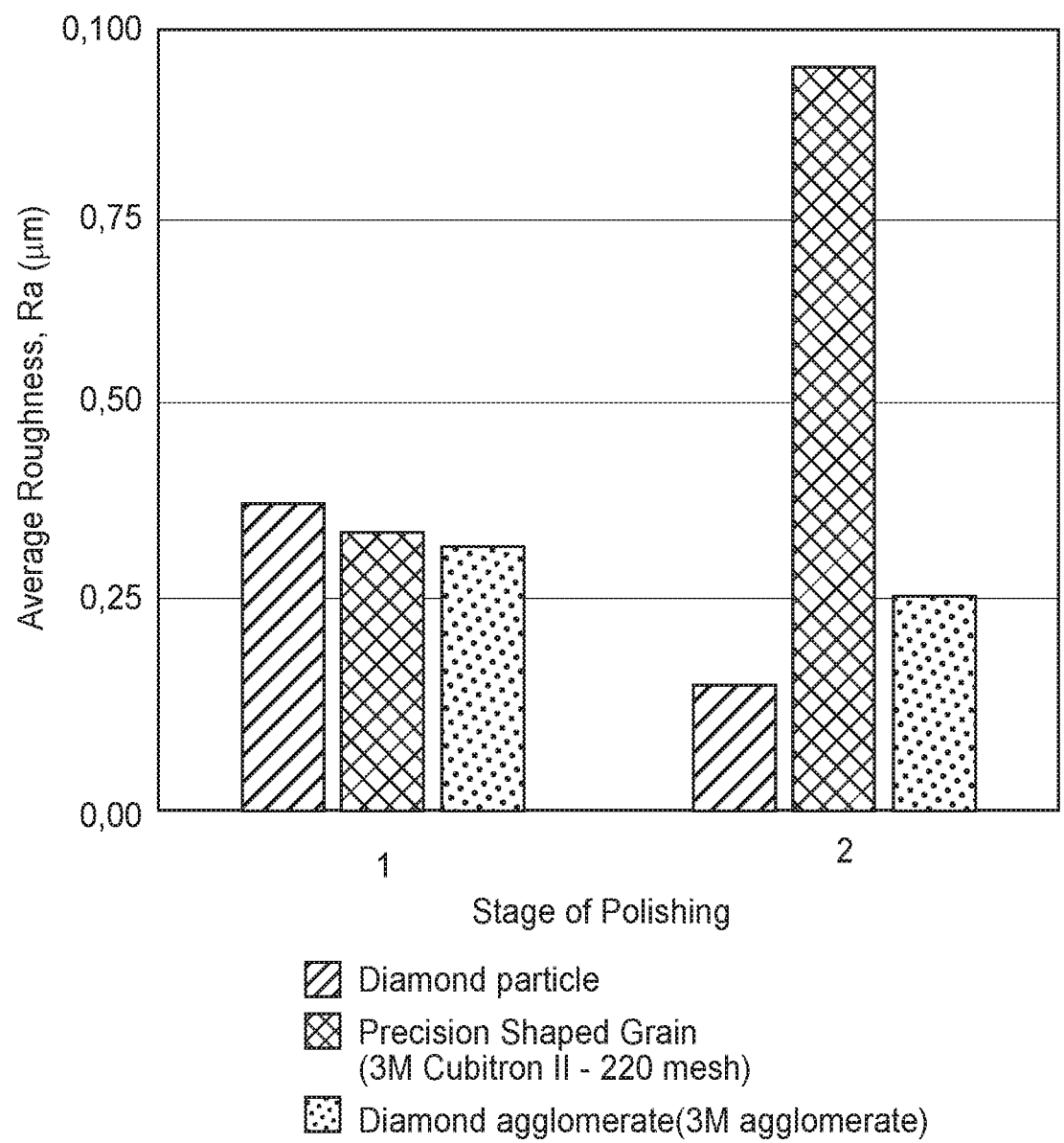
FIG. 8 illustrates the result of test of the average roughness of different articles produced by a method of the present invention.

FIG. 7 shows the gloss test of different finishing tools prepared in Example 3. The gloss was measured before (stage I) and after (stage II) the polishing test. The gloss was significantly increased by using the finishing tools produced in Example 3. FIG. 8 shows the results of a roughness tests for using the finishing tools produced in example 3 before (stage I) and after (stage II) the polishing test.

Figure 9:
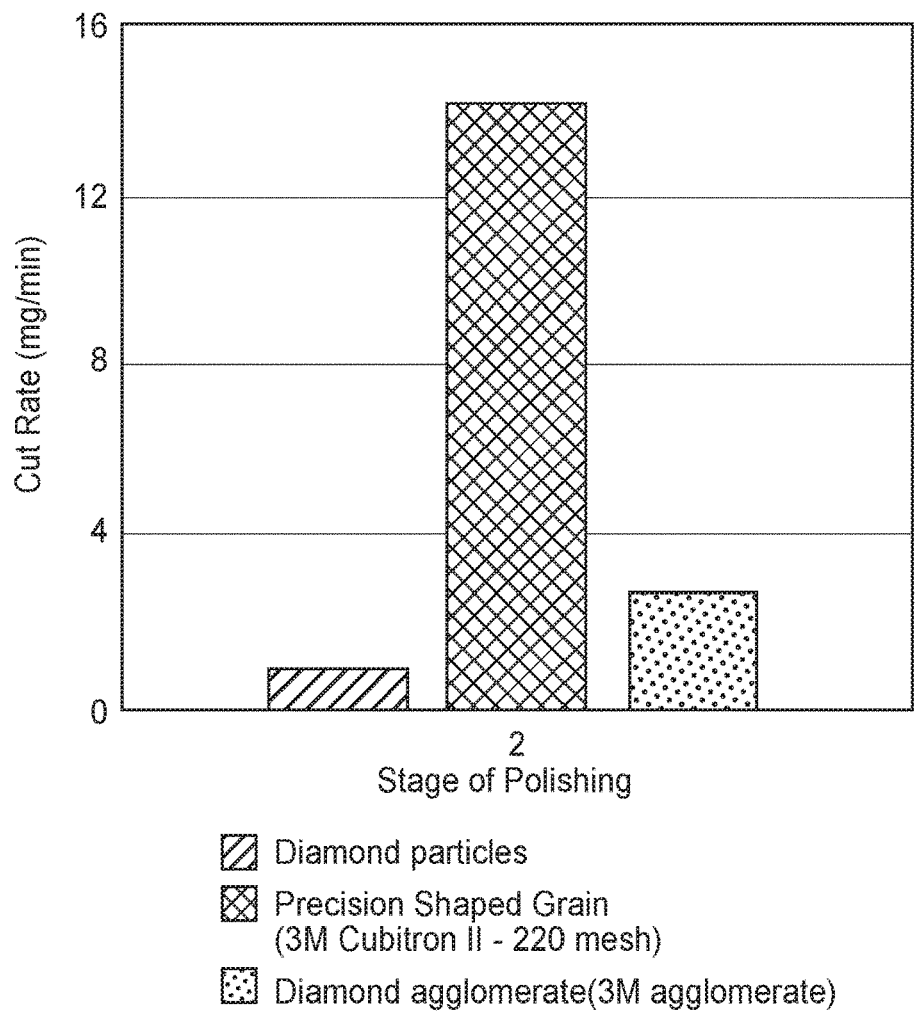
FIG. 9 illustrates the result of the cut rate of different articles produced by a method of the present invention.

By using of the finishing tools produced in example 3 the average roughness of the material treated by the finishing tools was significantly reduced. FIG. 9 shows the cut rate of the finishing tools produced in example 3 after the polishing test. The tools show a high cut rate.

Example 4

In example 4 articles were produced as described in example 1 but using two different powders.

Figure 10:
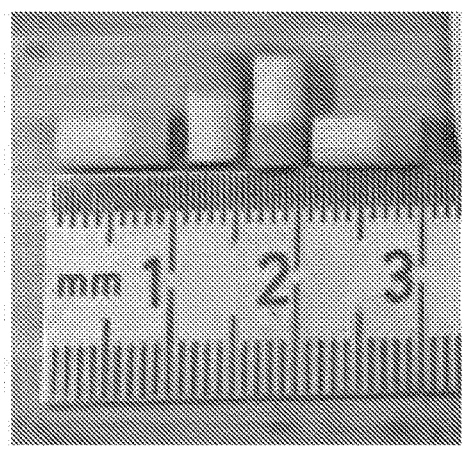
FIG. 10 illustrates a picture of articles produced by a method according to the present invention.

The first powder comprised the TPU of example 1 and diamond particles, (MD10, 6 to 12 μm, commercially available from Van Moppes Co, Geneva, Switzerland). The second powder contained the same TPU but a different type of diamond particles (Diamond MBM from Sandvik-Hyperion, Fair Lawn N.J., USA). The first 75 layers were printed using the first powder. Then the next 50 layers were printed using the second powder. The interface between the different powders did not show any distortion and the layers the first and second powder were tightly bonded together. A picture of the articles produced in example 4 is shown in FIG. 10.

In addition, also other articles were manufactured according to the above described method. The powder used for manufacturing these articles comprised the TPU of example 1 and diamond particles (Diamond WWS-300, D64 (230/270 mesh) commercially available from World Wide Super-abrasives LLC, Boynton Beach, Fla., USA). Articles produced with these powders did not show any curling or other defects.

Example 5

Articles were produced as described in Example 1 but using various powders containing the TPU of example 1 and either a polyamide or a polypropene in the amounts shown in the table below. The hardness of the articles produced is also shown in Table I below.

TABLE I

| Composition | Shore D Hardness (Durometer) |
|---|---|
| 100% TPU (X92-A2 Luvosint) | 33 |
| 100% TPU (X92-A1 Luvosint) | 29.5 |
| 50% X92-A1 + 50% PA12 | 38 |
| 50% X92-A1 + 50% PP | 38.5 |
| 75% X92-A1 + 25% PP | 35.3 |
| 75% X92-A1 + 25% PA12 | 30.8 |

The articles produced did not show curling or other significant defects.

Example 6

Example 6 was carried out as described for example 1 except that the powder was a thermoplastic fluoropolymer (THV 221 AZ, particle size 200 μm; mp of 153° C. DIN EN ISO 12086, shore D of 44, Flexural Modulus, 23° C. ASTM D 790 of 80 MPa, elongation at break of 550%, DIN EN ISO 527-1, test speed 50 mm/min) from Dyneon GmbH, Burgkirchen, Germany). Rectangular articles having a 15-layer thickness were produced. They did not show any curling.

Comparative Example 1

Example 6 was repeated but with different fluoropolymer powder (ET6218AZ from Dyneon GmbH, Burgkirchen Germany, a TFE-E copolymer, particle size 200 μm, mp of 266° C. DIN EN ISO 12086, shore D of 69, Flexural Modulus, 23° C. ASTM D 790 of 1000 MPa, elongation at break of 400%, DIN EN ISO 527-1, test speed 50 mm/min). Curling occurred already when depositing the first layer.

Example 7

Figure 11:
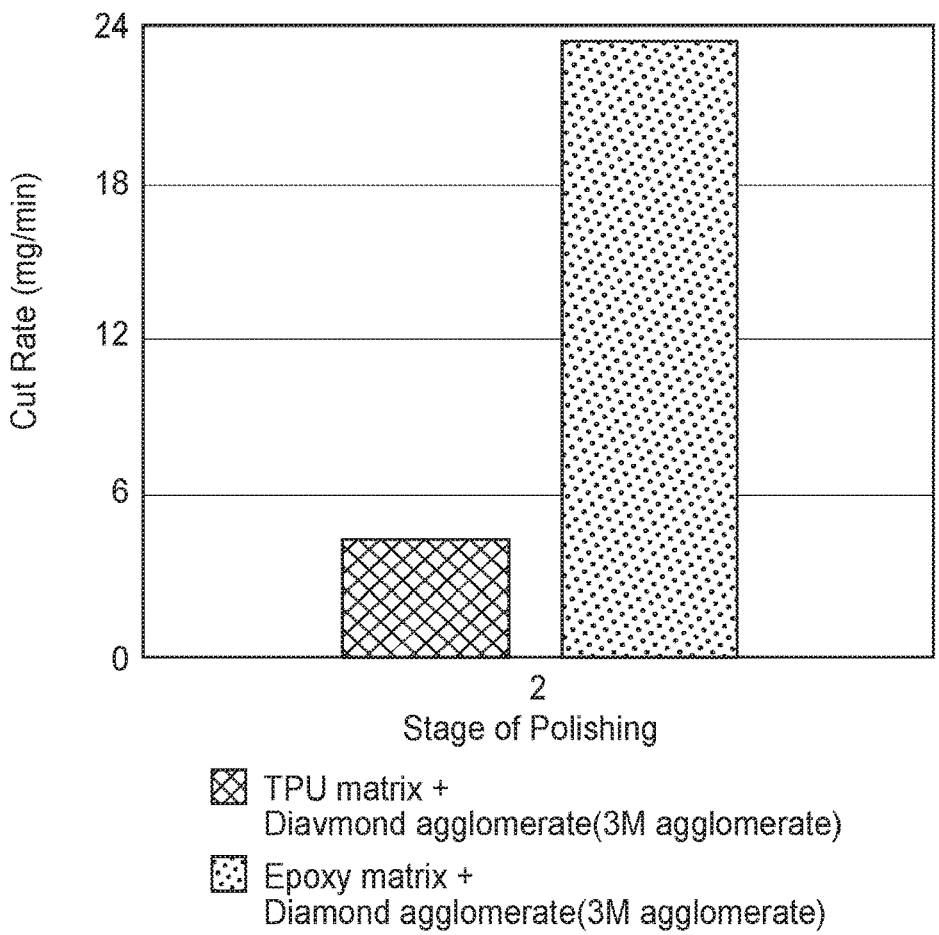
FIG. 11 illustrates a comparison of the average roughness between two articles being produced by a method according to the present invention.

Example 1 was repeated except that the first powder was that used as in example 1 but further containing diamond agglomerates as abrasive particles. The same article was produced in a separate run using a powder comprising an epoxy resin, SU6233 and the same diamond agglomerates as abrasive particles. Both articles did not show any curling or other defects. The cut rate of the articles prepared was compared. As can be seen from FIG. 11, the cut rate of the second article with the epoxy resin matrix is significantly higher than of the first article.

Figure 12:
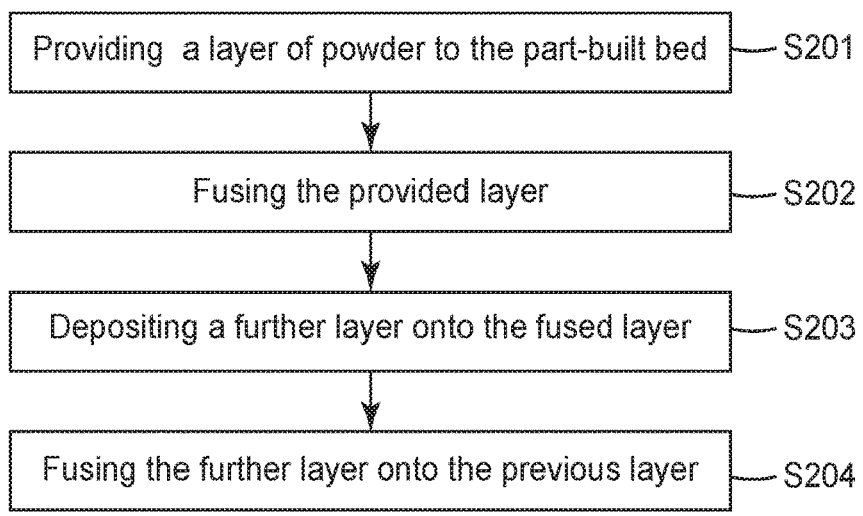
FIG. 12 illustrates a flowchart according to an exemplary embodiment of another method of the present invention.

An alternative method for creating articles comprising inorganic particles without using a substrate is illustrated in the flow chart of FIG. 12 as exemplary embodiment.

In a first step S201, a layer of powder is provided to the bed 600 as shown in FIG. 2. This is done by moving up the bottom plate 400 and by using the leveling roller 500 such that a layer of powder is provided in the part-built bed 600. The powder can be the first or second powder as described above but contains inorganic particles as described above.

In a second step S202, the provided layer is fused in a desired pattern.

In a third step S203, a further layer is deposited onto the fused layer in the bed 600.

In a fourth step S204, the further layer of powder is fused onto the previous layer in a desired pattern.

By repeating steps S203 and S204, the desired article 800 is built up layer by layer until the article 800 is formed.

The method according to the embodiment of FIG. 12 does not necessarily comprise constrained sintering, although constrained sintering in the context of this method is well possible. In case where no constrained sintering is applicable/desired, however, the chamber, the powder and/or the article have to be heated up to temperatures used in conventional SLS, usually above 150° C., depending on the used (co)polymer.

The foregoing method steps and examples have been described as relating to Selective Laser Sintering but methods other than selective laser sintering may be used.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove.

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A method for additive layer manufacturing in an additive manufacturing device configured for processing a powder, the method comprising:
   (i) providing at least one substrate that is not a powder and has a surface adapted for receiving one or more powders to a container of the additive manufacturing device, the container being configured for receiving a powder for processing;
   (ii) depositing onto at least a part of the substrate, at a predetermined location on the surface of the substrate, at least a first layer of a first powder comprising a first plurality of particles including at least a first (co) polymer having a melting point between 95° C. and 280° C., the surface of the substrate being composed of a material different from the first (co) polymer;
   (iii) fusing, by applying energy generated by at least one energy source of the additive manufacturing device, and according to selective laser sintering, the deposited first layer of the first (co)polymer onto the predetermined location on the surface of the substrate, thereby forming a first fused (co)polymer layer, and
   optionally sequentially repeating steps (i)-(iii),
   wherein at least one of the container configured for receiving the powder, the substrate, or the first layer of the first powder is at a temperature ranging from 10 to 35° C. prior to performance of step (iii).

2. The method of claim 1, wherein the temperature is a temperature ranging from 15 to 30° C.

3. The method of claim 1, further comprising;
   (iv) depositing, at the predetermined location on the surface of the substrate, at least one layer of a second powder comprising a second plurality of particles including at least a second (co)polymer onto at least a part of the first fused (co)polymer layer from step (iii);
   (v) fusing the second (co)polymer onto at least a part of the first fused (co)polymer layer generated in step (iii) by applying energy generated from at least one energy source of the additive manufacturing device to the predetermined location according to the selective laser sintering, wherein the second powder and the first powder are of a same material; and
   (vi) sequentially repeating steps (iv) and (v) to create an article.

4. The method of claim 1, further comprising
   (iv) depositing at least one layer of a second powder comprising a second plurality of particles including at least a second (co)polymer different from the first (co)polymer onto at least a part of first fused (co) polymer layer formed at step (iii);
   (v) fusing the second (co)polymer onto the part of the first fused (co)polymer layer generated in step (iii) by applying energy generated from at least one energy source of the additive manufacturing device according to the selective laser sintering; and
   (vi) sequentially repeating steps (iv) and (v) to create an article.

5. The method of claim 4, wherein at least one of the first (co)polymer or the second (co)polymer is selected from the group consisting of polyamides, polypropylenes and combinations thereof.

6. The method of claim 4, wherein at least one of the first powder or the second powder further comprises inorganic particles comprising one or more aluminum oxide, one or more silicon carbide, one or more boron carbide, one or more boron nitride, one or more diamonds and combinations thereof.

7. The method of claim 1, wherein the energy source comprises a laser configured to scan an emitted laser beam over the deposited layer of first powder at the predetermined location on the surface of substrate.

8. The method of claim 1, wherein the first layer of the first powder has a thickness that is equal to or approximately equal to an average diameter of a respective powder particle the plurality of powder particles.

9. The method of claim 8, wherein the thickness of the first layer of the first powder is 300 μm or less.

10. The method of claim 9, wherein the diameter of the respective powder particle of the first plurality of powder particles ranges from 3 μm to a diameter less than 300 μm.

11. The method of claim 1, wherein the first (co)polymer is selected from the group consisting of thermoplastic (co)polymers, thermoplastic elastomeric (co)polymers, and cross-linkable (co)polymers.

12. The method of claim 1, wherein the first (co)polymer is a thermoplastic (co)polymer selected from the group consisting of polyurethanes, fluoropolymers and combinations thereof.

13. The method of claim 1, wherein the first (co)polymer is a thermoplastic (co)polymer exhibiting an elongation at break of at least 200%.

14. The method of claim 1, wherein the first (co)polymer is a partially fluorinated thermoplastic fluoropolymer.

15. The method of claim 1, wherein the first (co)polymer is a thermoplastic or cross-linkable (co)polymer including units derived from TFE and HFP monomers, and at least one comonomer selected from vinyl fluoride (VF), vinylidene fluoride (VDF), ethene (E), propene (P), or a combination thereof.

16. The method of claim 1, wherein the surface of the substrate comprises a material selected from metals, organic fibers, inorganic fibers, ceramics, and combinations thereof.

17. The method of claim 1, wherein the surface of the substrate comprises a plurality of alternately raised areas and lowered areas having at least one longest dimension of from about 1/10 up to about 3 times an average diameter of the first plurality of powder particles.

18. The method of claim 17, wherein the plurality of alternately raised areas comprises a plurality of ridges, and the plurality of lowered areas comprises a plurality of grooves, optionally wherein the first plurality of powder particles includes particles of the first (co)polymer having a diameter of from 3 μm to less than 300 μm.

19. An article produced using the method of claim 1, optionally wherein the article is an abrasive article.

* * * * *